J. FORSTER.
MACHINE FOR BLOWING GLASS CYLINDERS.
APPLICATION FILED JAN. 22, 1910.
1,038,335.
Patented Sept. 10, 1912.
3 SHEETS—SHEET 1.
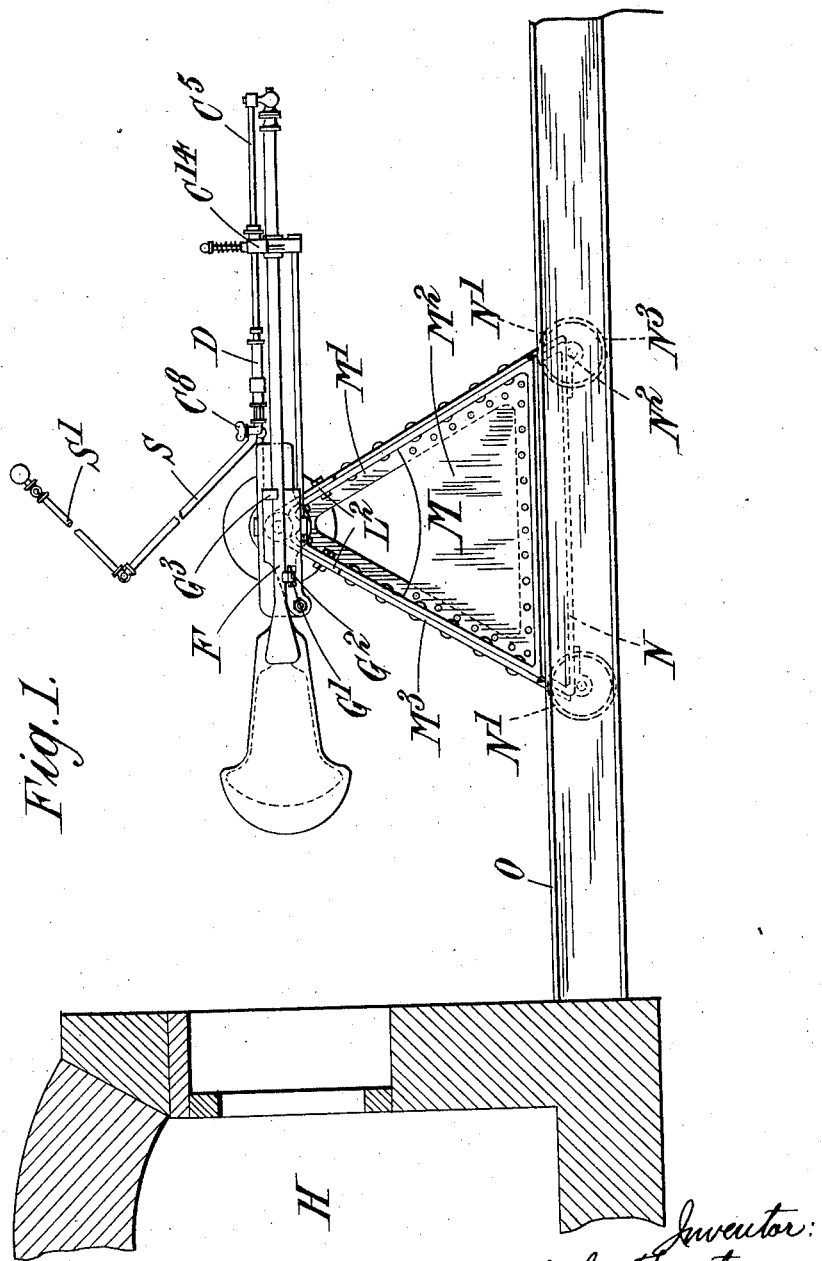

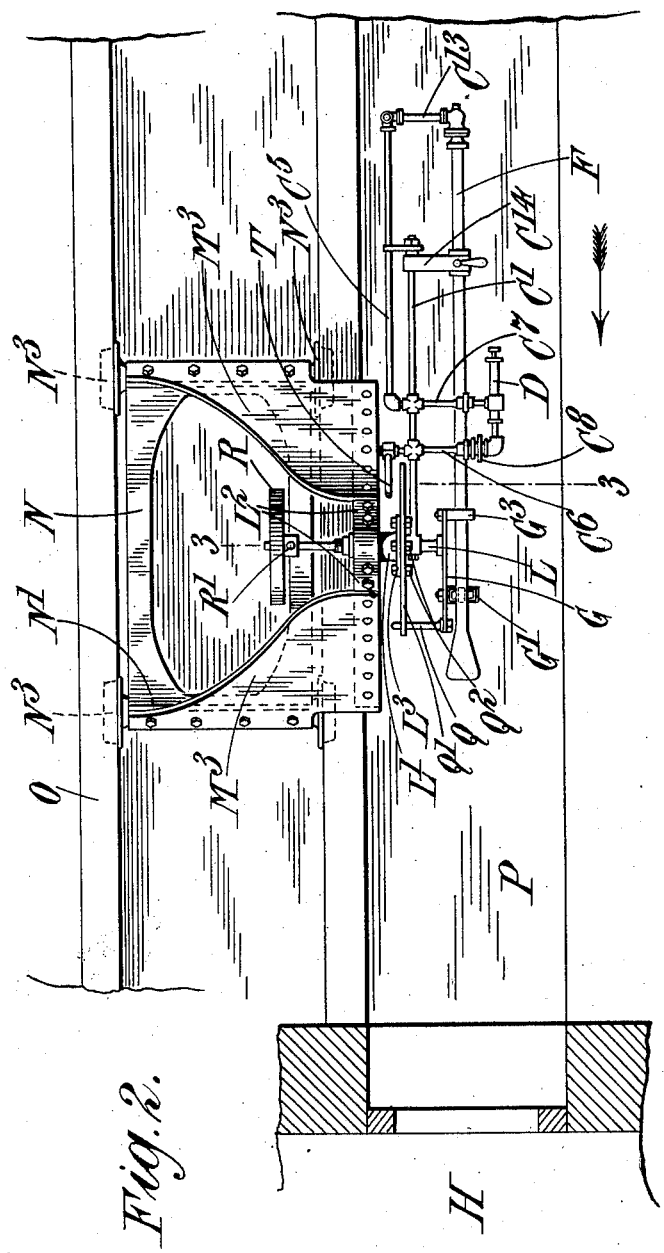

J. FORSTER.
MACHINE FOR BLOWING GLASS CYLINDERS.
APPLICATION FILED JAN. 22, 1910.
1,038,335.
Patented Sept. 10, 1912.
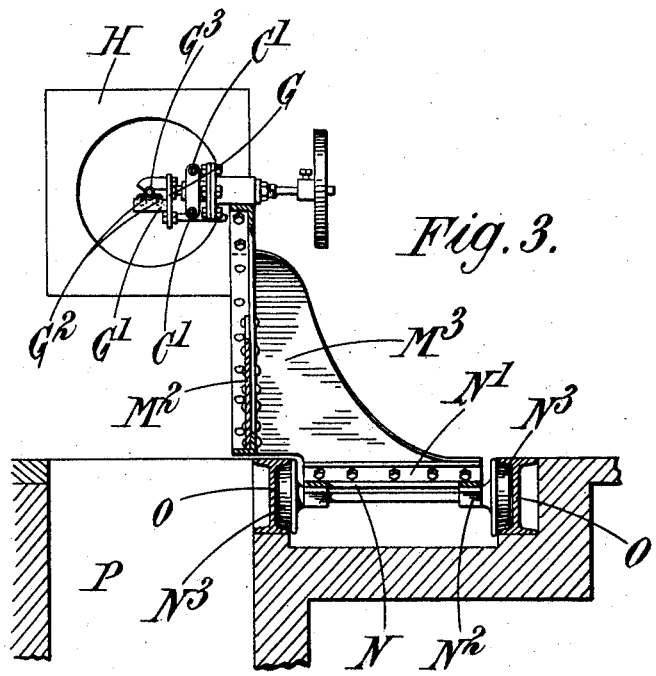
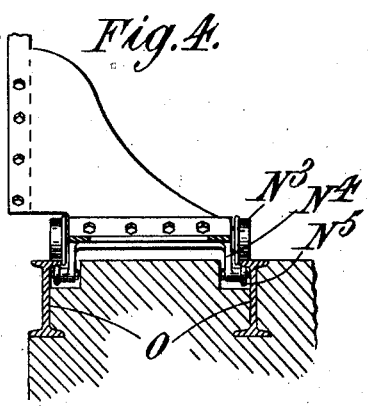

UNITED STATES PATENT OFFICE.

JOHN FORSTER, OF ST. HELENS, ENGLAND.

MACHINE FOR BLOWING GLASS CYLINDERS.

1,038,335.  Specification of Letters Patent.  Patented Sept. 10, 1912.

Application filed January 22, 1910. Serial No. 539,620.

*To all whom it may concern:*

Be it known that I, JOHN FORSTER, subject of the King of England, and residing at St. Helens, Lancashire, England, have invented certain new and useful Improvements in Machines for Blowing Glass Cylinders, of which the following is a specification.

This invention relates to glass-blowing machines of the kind described in the specification of my prior patent application, Serial Number 452,637, filed September 11th, 1908, which shows a machine especially adapted for making glass cylinders from which window-glass is afterward made, but which may be used for making other glass articles. In the kind of machine referred to a blow-pipe carrier is arranged on rails or similar guides so that it can be run up to or away from the glass-tank as desired. In the prior machine the blow-pipe carrier was arranged to run on rails which were at about the same height above the floor as the blowing hole in the glass-tank or re-heating furnace. With this construction the passage across the swinging pit or from one side to the other of the machine was obstructed so that the workman had to pass around the ends of the rails when journeying for instance between the gathering holes and the machine or from one blowing hole to another.

The object of the present invention is to overcome this objection and accordingly the blow-pipe is supported so as to leave a free passage over the pit and working platform.

Referring to the accompanying drawings in which like letters indicate like parts; Figure 1 is a front elevation of a machine constructed according to this invention; Fig. 2 is a plan of the same; Fig. 3 is a sectional elevation on line 3—3 of Fig. 2 looking in the direction of the arrow; Fig. 4 shows part of a machine which is a modification of that shown in Figs. 1–3.

The method of producing glass cylinders with machines constructed according to this invention is the same as that employed with the prior machine; that is to say, the blow-pipe with a bulb of glass attached to it is placed in a holder or swing arm on the carrier and connected to the compressed air supply and swung in a vertical plane and at the same time rotated about its own axis.

In the drawings H is the glass tank or re-heating furnace. The blow-pipe F is supported by the bracket $C^{14}$ attached to the rods $C^1$ $C^1$ and the brackets $G^1$ $G^3$ attached to the plate G. The bracket $G^1$ is provided with rollers $G^2$ and the connection of the blow-pipe with the air pipe $C^{13}$ (Fig. 2) is such that the blow-pipe can be easily rotated. Air is supplied through the pipe $C^6$, whence it passes through stop cock $C^8$, controlling valve D, pipe $C^7$ pipe $C^5$ to the pipe $C^{13}$.

All the parts just referred to correspond to the similarly lettered parts in the specification of my prior patent application Serial Number 452,637 filed September 11th, 1908, and require no further description herein.

Referring now to Figs. 1, 2 and 3, according to the present invention the plate G is provided with an axle L which turns in a cast bush $L^1$. The bush $L^1$ is provided with wing members $L^2$ which latter are bolted to a triangular shaped standard or frame M. The standard or frame M consists of a triangle of angle-iron $M^1$ provided with a gusset plate $M^2$. The frame or standard M is secured on a carriage, stays $M^3$ being provided to give the necessary rigidity. The carriage consists of a rectangular shaped member N having turned up ends $N^1$. Two members $N^2$ are bolted to the turned up ends $N^1$ on the member N and support the axles for wheels $N^3$. Arranged beneath the level of the floor are joists or girders O between the flanges of which the wheels $N^3$ fit. The wheels $N^3$ are preferably fitted with ball bearings for easy running and they are a good fit between the flanges of the joists O so as to prevent any side oscillation of the carriage. With this arrangement the blow-pipe can be moved along over the swinging pit P to and from the re-heating furnace H as desired. In order to retain the blow-pipe holder in a substantially horizontal position as shown in the drawings a stop or projection Q is provided on the plate G and this stop engages a wrought metal stop plate $Q^1$ removably secured by bolts $Q^2$ to a flange $L^3$ on one end of the fixed bush $L^1$. The stop plate $Q^1$ extends on either side of the horizontal axle L of the holder, so that the stop Q may engage either end as required. In order that the blow-pipe may rest in either position, it is necessary that the lower edge of the plate $Q^1$ should be at a height suitable to the glass article being made. By making the plate $Q^1$ removable a suitable one can be fitted to the machine according to the class of article being made. In order to balance the weight of the swinging blow-pipe, holder, and parts carried thereby, the axle L is extended on the opposite side of the standard M and is provided with a balancing weight R. The weight R is movable along the axle L and can be clamped in any desired position by a screw R¹. The weight R is made adjustable in this way so that the machine can be used for making glass articles of various weights. The flexible connection between the air supply and the pipe C⁶ may consist of two jointed pipes S and S¹. The joints are such as to permit movement of the pipes in a vertical plane when the blow-pipe and its holder are swung in the process of forming glass cylinders.

Referring to Fig. 4 an arrangement similar to that shown in Figs. 1–3 is illustrated but in this case no pit or channel has to be provided on the working platform for the carriage to run in. The joists O are sunk in the working platform or floor and the carriage is provided with wheels N³ which run on the tops of the joists. Brackets N⁴ are attached to the carriage and carry small wheels N⁵ which engage with the underside of the top flanges of the joists O. The wheels N⁵ prevent the apparatus being tipped over and also prevent its being run off the tops of the joists O.

It will readily be understood by those familiar with the art that various changes may be made in the details of construction and general arrangement of the parts without departing from the spirit and scope of my invention as defined in the appended claims.

What I claim as my invention and desire to secure by Letters Patent is:—

1. A glass blowing machine, comprising a blow pipe, a blow pipe carrier having wheels below the floor level, a track comprising a plurality of rails below the floor level, said rails having upper and lower flanges between which the wheels of the carrier are arranged to rotate, the wheels of the carrier being adapted to engage both flanges of the rails to prevent vertical and transverse movements of the carrier; substantially as described.

2. A glass blowing machine, comprising a blow pipe carrier, a frame or standard supporting said carrier extending above and below the level of the floor, a blow pipe mounted on said carrier and at the side of the frame, rails situated beneath the level of the floor, each of said rails having upper and lower flanges, wheels on said carrier arranged to engage both flanges of the rails, and a longitudinally disposed pit below said blow pipe; substantially as described.

3. In a glass blowing machine of the kind referred to the combination of a blow-pipe carrier a spindle L on which said carrier is rotatable a frame or standard supporting said spindle, rails situated beneath the level of the floor and on which said standard can be moved, a removable adjustable plate Q¹ secured to said standard and adapted to act as a stop to enable the blow-pipe to remain balanced in a substantially horizontal position, and an adjustable counter-balance weight for said carrier.

4. In a glass blowing machine of the kind referred to the combination of a blow-pipe carrier a spindle about which said carrier can rotate a standard or frame supporting said spindle a counter-balance weight on said spindle, wheels on said standard or frame, girders or joists situated beneath the level of the floor and between the flanges of which said wheels are adapted to run and a plate Q¹ secured to said standard or frame and adapted to permit of the blow-pipe carrier being balanced in such a position that the blow-pipe is in a substantially horizontal position.

In testimony whereof I have signed my name to this specification in the presence of two subscribing witnesses.

JOHN FORSTER.

Witnesses:
  H. WATSON,
  H. WILLIAMS.

---

Copies of this patent may be obtained for five cents each, by addressing the "Commissioner of Patents, Washington, D. C."